United States Patent
Diril et al.

(10) Patent No.: US 10,354,431 B2
(45) Date of Patent: Jul. 16, 2019

(54) LEVEL OF DETAIL OFFSET DETERMINATION

(71) Applicant: Apple Inc., Cupertino, CA (US)

(72) Inventors: Abdulkadir U. Diril, Mountain View, CA (US); Adam T. Moerschell, San Jose, CA (US); Anthony P. DeLaurier, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 534 days.

(21) Appl. No.: 14/735,707

(22) Filed: Jun. 10, 2015

(65) Prior Publication Data

US 2016/0364899 A1 Dec. 15, 2016

(51) Int. Cl.
  *G06T 15/04* (2011.01)
  *G06T 1/20* (2006.01)
  *G09G 5/39* (2006.01)

(52) U.S. Cl.
  CPC ............... *G06T 15/04* (2013.01); *G06T 1/20* (2013.01); *G09G 5/39* (2013.01); *G06T 2200/28* (2013.01); *G06T 2210/36* (2013.01)

(58) Field of Classification Search
  CPC ............... G06T 15/005; G06F 12/0875; G06F 2209/5017; H04L 67/36; G01C 21/367; G09G 2340/02; H04N 19/436
  USPC ........................................................ 345/587
  See application file for complete search history.

(56) References Cited

U.S. PATENT DOCUMENTS

| | | | |
|---|---|---|---|
| 6,002,407 A | 12/1999 | Fadden | |
| 6,429,873 B1 * | 8/2002 | Kacevas | G06T 15/04 345/552 |
| 6,738,070 B2 * | 5/2004 | Brokenshire | G06T 1/60 345/581 |
| 6,924,811 B1 | 8/2005 | Minkin | |
| 7,136,069 B1 * | 11/2006 | Dawson | G06T 15/04 345/211 |
| 2010/0091028 A1 * | 4/2010 | Grossman | G06T 15/04 345/587 |
| 2016/0078667 A1 * | 3/2016 | Shim | G06T 15/04 345/420 |

* cited by examiner

*Primary Examiner* — Barry Drennan
(74) *Attorney, Agent, or Firm* — Michael B. Davis; Meyertons, Hood, Kivlin, Kowert & Goetzel, P.C.

(57) ABSTRACT

Techniques are disclosed relating to determining the location of a specified level of detail for a graphics texture. In some embodiments, an apparatus includes texture processing circuitry configured to receive information specifying a particular mipmap in a chain of stored mipmaps for a graphics texture and determine an offset address for the particular mipmap. In these embodiments, the texture processing circuitry is configured to determine the offset address by operating on a value that indicates a greatest potential chain size for chains of mipmaps in a graphics processing element. In these embodiments, the operating includes masking upper bits of the value based on a size of the texture and masking lower bits of the value based on a position of the specified mipmap in the chain of stored mipmaps. Disclosed techniques may reduce power consumption and/or area of circuitry configured to determine the offset.

20 Claims, 9 Drawing Sheets

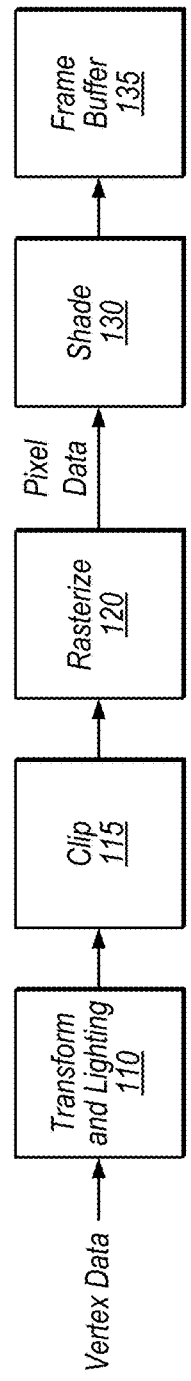
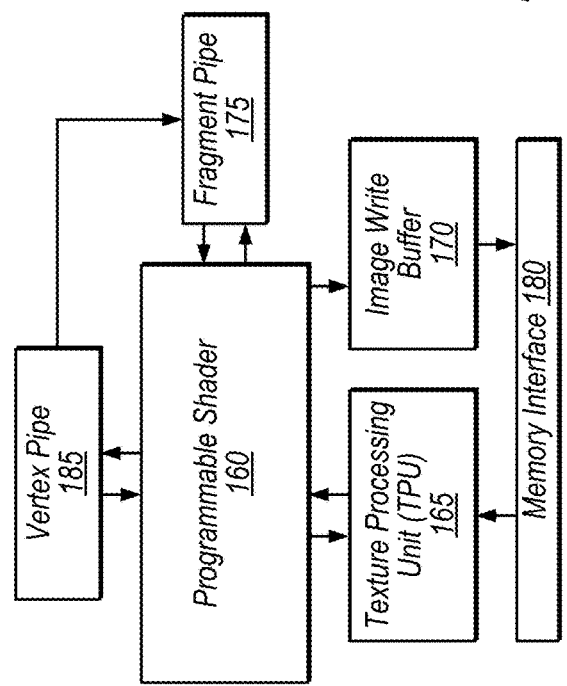

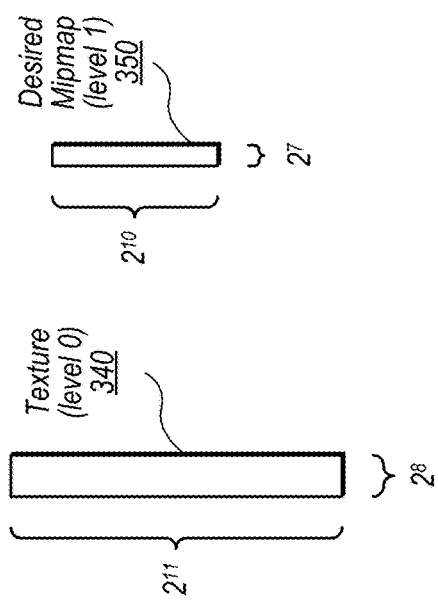

EXEMPLARY GPU PARAMETERS:
Max texture size = $2^{14}$ by $2^{14}$ = $2^{28}$
Max number of LODs in mipmap chain = 15
Greatest potential chain size = 10101010101010101010101010101 (binary)
Greatest potential 1D size = 111111111111111 (binary)

EXEMPLARY TEXTURE ATTRIBUTES:
Actual texture size = $2^{11}$ by $2^8$ = $2^{19}$
Small side exponent = 8. Number of LODs with different small sides (widthNumLODs) = 9
Large side exponent = 11. Number of LODs with different large sides (lengthNumLODs) = 12

EXEMPLARY PROCESS for LOD 1:
- Average number of LODs with different sides = (12 + 9) / 2 = 10.5
- For this texture size, mask upper 2×(15−10) = 10 bits:
- For LOD 1, mask lower 2×(10−1) = 18 bits
  000000000001010101010101010101 (binary)
  000000000001000000000000000000 (binary)
  000000000001000000000000000000 (binary)
- Shift one to the left because of non-integer average, obtain desired offset.

*FIG. 3*

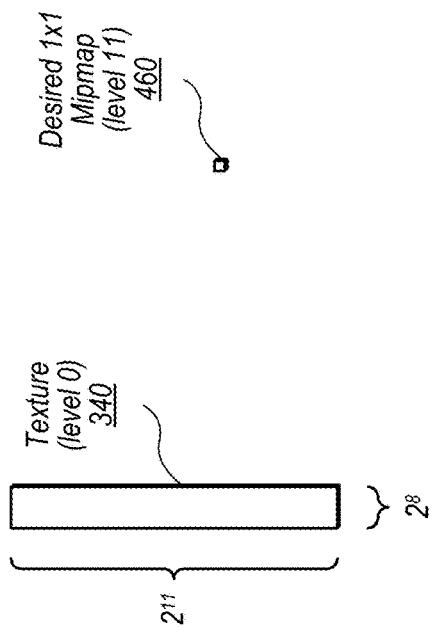

EXEMPLARY GPU PARAMETERS:
Max texture size = $2^{14}$ by $2^{14}$ = $2^{28}$
Max number of LODs in mipmap chain = 15
Greatest potential chain size =  1010101010101010101010101010 (binary)
Greatest potential 1D size    =               11111111111111 (binary)

EXEMPLARY TEXTURE ATTRIBUTES:
Actual texture size = $2^{11}$ by $2^8$ = $2^{19}$
Small side exponent = 8. Number of LODs with different small sides (widthNumLODs) = 9
Large side exponent = 11. Number of LODs with different large sides (lengthNumLODs) = 12

EXEMPLARY PROCESS for LOD 1:
- Average number of LODs with different sides = (12 + 9) / 2 = 10.5
- For this texture size, mask upper 2x(15-10) = 10 bits:
  00000000000101010101010101010101 (binary)
- For LOD 11, mask lower 2x(10-9) = 2 bits
  00000000000101010101010101010100 (binary)
- Shift one to the left because of non-integer average, get 2D size:
  00000000001010101010101010101000 (binary)

- For single pixel side portion, mask upper 15-(12-9) = 12 bits
  00000000000000000000000000000111 (binary)
- Mask lower 12-11 = 1 bits, get single-pixel side size
  00000000000000000000000000000110 (binary)
- OR with 2D size:
  00000000001010101010101010101110 (binary)

FIG. 4A

```
1.  TWO_D_MAX_NUM_TEX = {1'b1,{14{2'b01}}};      // Max number of texels for 2D mipmap chain - 16k x 16k
2.  ONE_D_MAX_NUM_TEX = {15{1'b1}};              // Max number of texels for 1D mipmap chain - 16k x 1
3.  MAX_NUM_LODS = 4'd15;

4.  input widthNumLODs;
5.  input heightNumLODs;
6.  input targetLOD;

7.  smallNumLODs = (widthNumLODs > heightNumLODs) ? widthNumLODs : heightNumLODs;
8.  largeNumLODs = (widthNumLODs > heightNumLODs) ? heightNumLODs : widthNumLODs;

9.  avgNumLODx2 = smallNumLODs + largeNumLODs;
10. upperMaskNumBits = {(MAX_NUM_LODS - avgNumLODx2[4:1]), 1'b0};
11. lowerMaskNumBits = {(avgNumLODx2[4:1] - targetLOD), 1'b0};

12. upperMask = 29'{{29{1'b1}} >> upperMaskNumBits};
13. lowerMask = 29'{{29{1'b1}} << lowerMaskNumBits};

14. 2Dsize = (TWO_D_MAX_NUM_TEX & upperMask & lowerMask) << avgNumLODx2[0];

15. oneDValid = targetLOD > smallNumLODs;
16. oneDNumLevels = largeNumLODs - smallNumLODs;
17. oneDtargetLOD = (targetLOD > largeNumLODs) ? 4'd0 : (largeNumLODs - targetLOD);

18. oneDMSBmask = 15'{{15{1'b1}} >> (4'd15 - oneDNumLevels)};
19. oneDLSBmask = 15'{{15{1'b1}} << oneDtargetLOD};
20. single-pixel_side_size = (ONE_D_MAX_NUM_TEX & oneDMSBMask & oneDLSBMask & {15{oneDValid}});

21. offset = 2Dsize | {14'd0, 1Dsize};
```

Mask upper bits of a value based on the size of a texture, wherein the value is indicative of a greatest potential chain size for chains of mipmaps in a graphics processing element
610

Mask lower bits of the value based on a position of a specified mipmap in a chain of stored mipmaps
620

LEVEL OF DETAIL OFFSET DETERMINATION

BACKGROUND

Technical Field

This disclosure relates generally to graphics processing and more specifically to texture mapping.

Description of the Related Art

Texture mapping is a well-known graphics processing technique in which a texture (e.g., an image) is applied to the surface of an object to be displayed. Textures may indicate color and transparency of pixels corresponding to object surfaces, for example.

Mipmapping is a common technique in which textures are pre-generated at multiple levels of detail (LOD). Each mipmap is a representation of the same texture at a lower resolution. This may reduce aliasing and improve performance, e.g., when textured objects are far away in a scene being rendered. The respective height and width of each mipmap is typically a power of two smaller than the previous level. For example, for an 8×16 texture, the next mipmap is 4×8, then 2×4, then 1×2 (then 1×1, for which the normal calculation breaks down and only one side is smaller than the previous mipmap).

Mipmaps are typically stored in memory together with the texture. Operations that access a texture are typically associated with a desired LOD corresponding to a desired mipmap. Based on this information, a texture processing unit must determine where the desired mipmap is stored.

SUMMARY

Techniques are disclosed relating to determining the location of a specified level of detail for a graphics texture.

In some embodiments, an apparatus includes texture processing circuitry configured to receive information specifying a particular mipmap in a chain of stored mipmaps for a graphics texture and determine an offset address for the particular mipmap. In these embodiments, the texture processing circuitry is configured to determine the offset address by operating on a value indicative of a greatest potential chain size for chains of mipmaps in a graphics processing element. In these embodiments, the operating includes masking upper bits of the value based on a size of the texture and masking lower bits of the value based on a position of the specified mipmap in the chain of stored mipmaps. In some embodiments, the apparatus is configured to access the particular mipmap based on the offset address. In some embodiments, the masking is performed using shift operations and/or AND gates. This approach may reduce power consumption relative to using adder circuitry to add the sizes of mipmaps in the chain.

In some embodiments, a method for determining an offset address for a specified mipmap includes operating on a value indicative of a greatest potential chain size for chains of mipmaps in a graphics processing element, including masking upper bits of the value based on a size of the texture and masking lower bits of the value based on a position of the specified mipmap in a chain of stored mipmaps. In these embodiments, the masking may convert the value to the offset address.

In some embodiments, a second value is added to a result of the masking, where the second value is indicative of the size of one or more mipmaps in the chain that are smaller in only one dimension relative to a prior mipmap. In some embodiments, the second value is added by ORing bits of the second value with the result of the masking. In some embodiments, the value is further modified based on a number of 1×1 mipmaps in the chain and/or based on mipmaps for the texture having a size that is smaller than a threshold size.

BRIEF DESCRIPTION OF THE DRAWINGS

FIG. 1A is a block diagram illustrating an exemplary graphics processing flow.

FIG. 1B is a block diagram illustrating one embodiment of a graphics unit.

FIGS. 3-4B are diagrams illustrating exemplary calculations of offsets to a desired mipmap, according to some embodiments.

FIG. 5 is a diagram illustrating exemplary code for configuring circuitry to calculate an offset to a desired mipmap, according to some embodiments.

FIG. 6 is a flow diagram illustrating one embodiment of a method for determining an offset to a specified mipmap.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 2A:
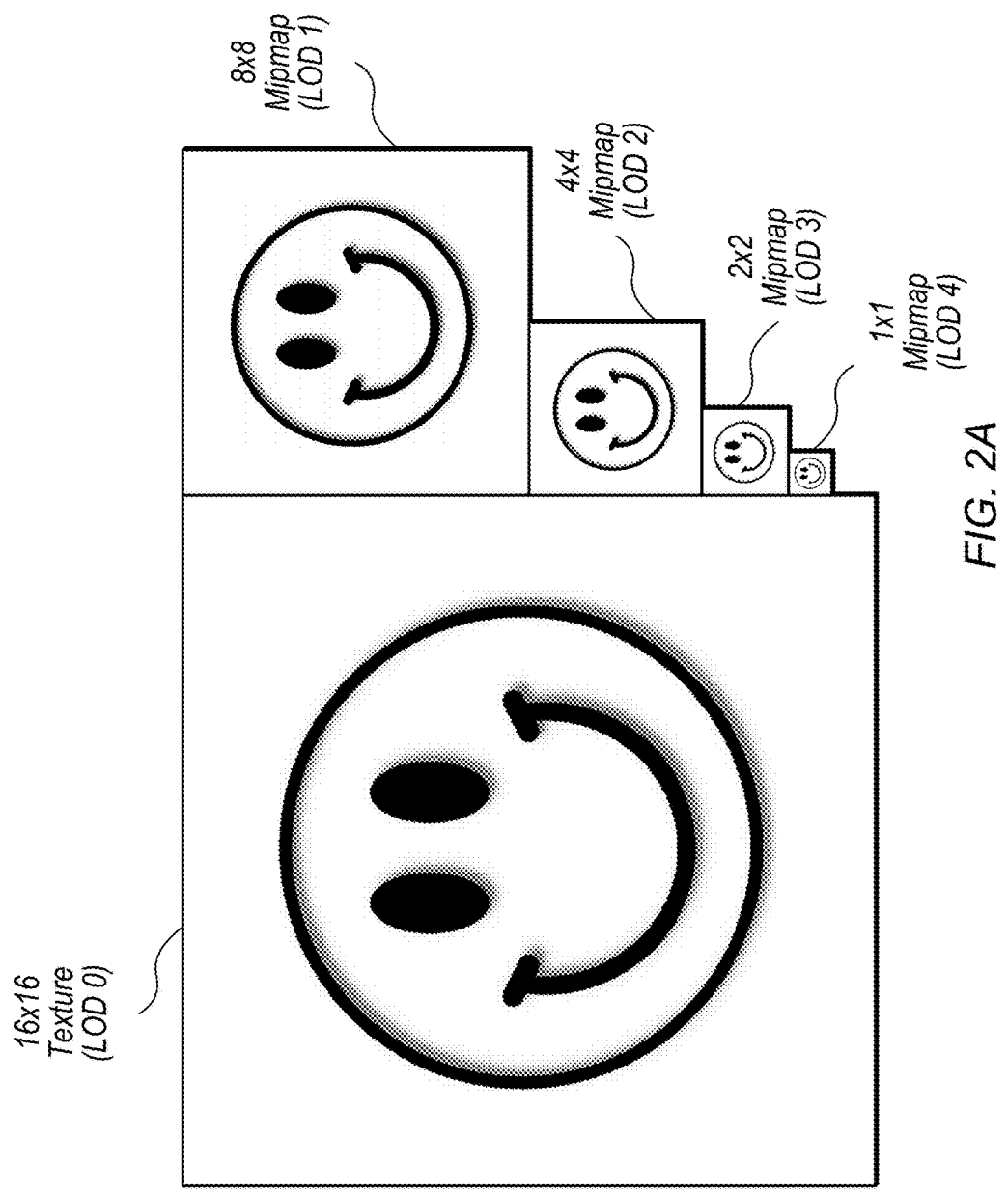
FIG. 2A is a diagram illustrating an exemplary texture and its mipmaps.
Figure 2B:
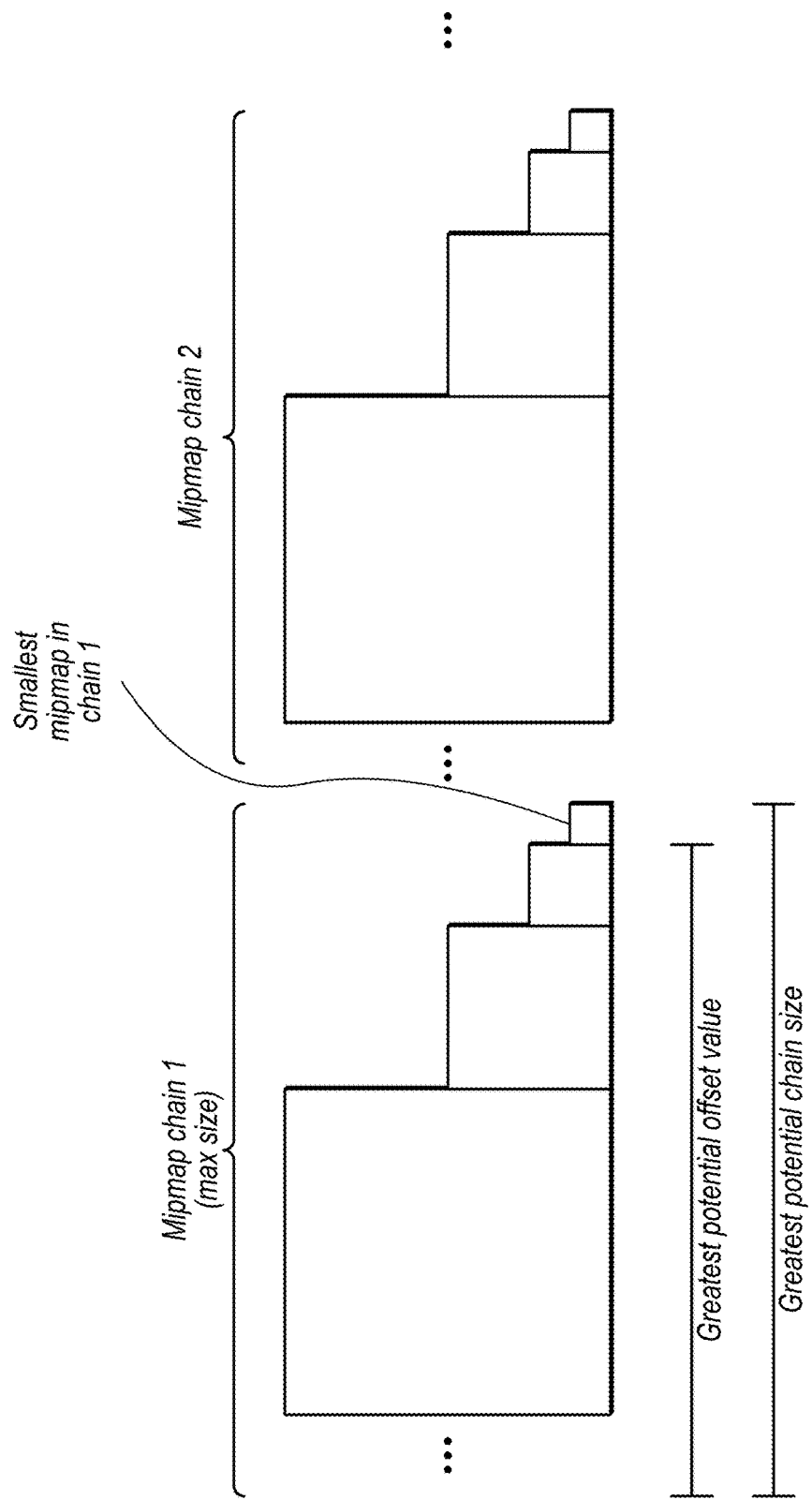
FIG. 2B is a diagram illustrating exemplary storage of a chain of mipmaps in a memory.
Figure 7:
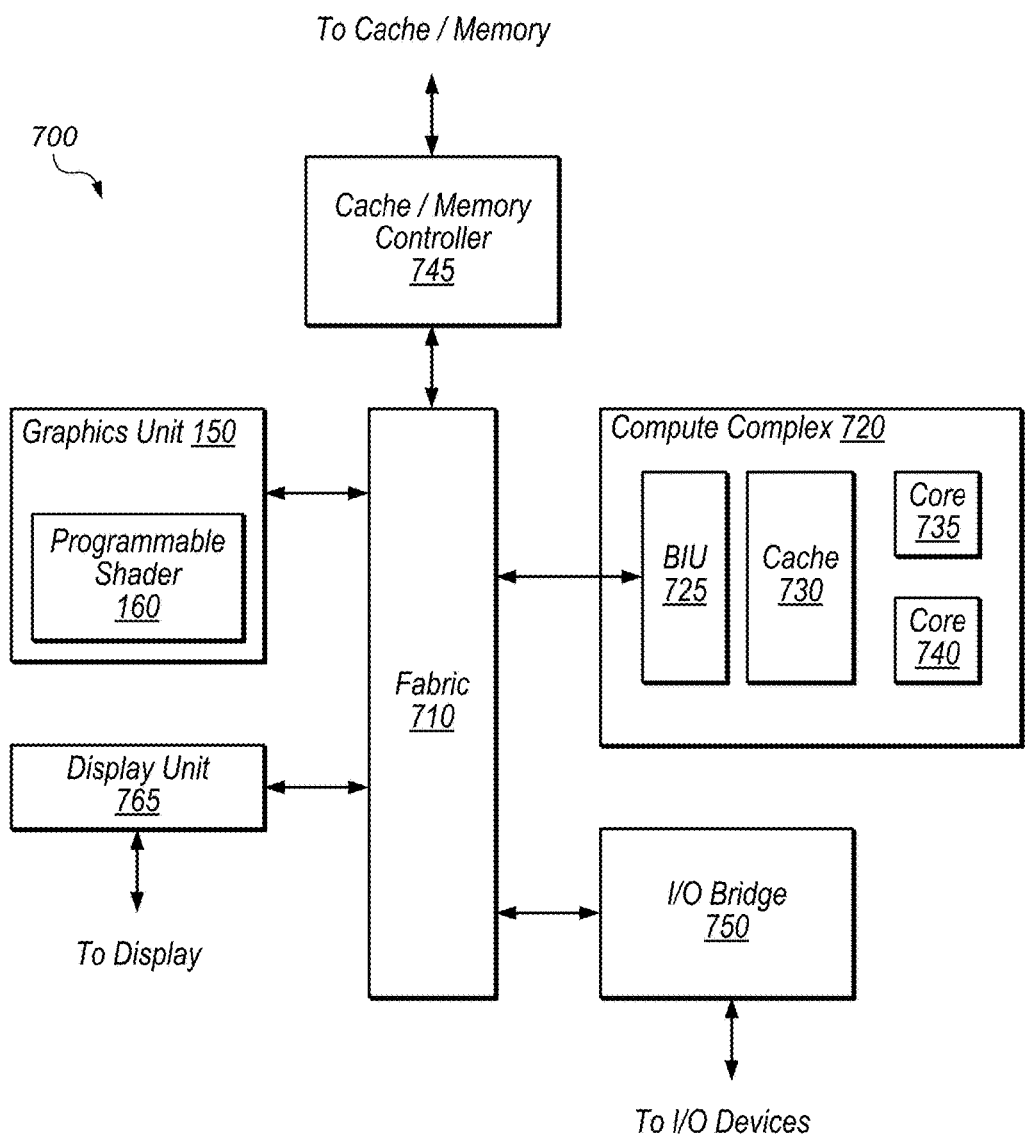
FIG. 7 is a block diagram illustrating one embodiment of a computing device that includes a graphics unit.

This disclosure initially describes, with reference to FIGS. 1A-1B, an overview of a graphics processing flow and an exemplary graphics unit. An exemplary mipmap chain and storage of mipmap chains is shown in FIGS. 2A-2B. Exemplary techniques and circuitry for determining the offset from the start of a texture to a specified mipmap are discussed with reference to FIGS. 3-6, while FIG. 7 shows an exemplary computing device that includes a graphics unit. The disclosed techniques may reduce power consumption and/or area of circuitry configured to determine level-of-detail offsets.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 that includes a texture state cache is shown. In the illustrated embodiment, graphics unit 150 includes programmable shader 160, vertex pipe 185, fragment pipe 175, texture processing unit (TPU) 165, image write buffer 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Overview of Mipmapping

As used herein, the term "texture" refers to data that indicates characteristics of the surface of an object to be rendered by a graphics processor for display. These characteristics may include color, transparency, etc. "Texture mapping" is a well-known graphics technique in which a texture is applied to the surface of a graphical element such as a shape or polygon. Textures may be "wrapped around" any of various 3-dimensional objects by mapping points in the objects to the texture.

Textures are typically represented by arrays of "texels" just as images are represented using arrays of pixels. Texels are typically the smallest unit of graphics element in texture space, and indicate red, green, blue, and alpha attributes in some embodiments. The alpha attribute may indicate various information in different embodiments; it is often used to indicate translucency. Often, graphics processors initially determine texture coordinates for vertices of a polygon and then interpolate to determine texture coordinates of individual pixels representing the surface of the polygon. When a calculated texture coordinate does not directly map to a texel, filtering rules may determine pixel attributes based on nearby texels.

Mipmapping is a technique in which lower-resolution versions of the texture are pre-generated and stored along with the texture. Generally, higher-resolution mipmaps (or the texture itself) are used for objects closer to the front of a scene while lower-resolution mipmaps are used for objects that are further away. Mipmapping may increase rendering speed and/or reduce aliasing artifacts. As used herein, the term "mipmap" refers to data that specifies one or more lower-resolution representations of an image.

FIG. 2A shows an exemplary texture and its corresponding mipmaps. For convenience, as used herein a "chain" of mipmaps refers to both a texture and its corresponding mipmaps. In various embodiments, each mipmap is typically a power of two smaller on each side than the previous mipmap in the chain, until one of the sides reaches a single texel (at which point subsequent mipmaps in the chain can no longer decrease in size in that dimension). Note that in some embodiments, textures with sides that are not powers of two may be padded to the next largest power of two in memory.

As shown, in some embodiments the texture is referred to as level-of-detail (LOD) 0 (zero) while greater LOD values correspond to smaller mipmaps. Thus, for the example texture of FIG. 2A, the texture is LOD 0 and the smallest mipmap is LOD 4. As shown in the illustrated embodiment, the texture is 16 by 16 texels (or $2^4$ by $2^4$). Thus, LOD 1 is an 8×8 ($2^3$ by $2^3$) mipmap. In this embodiment, proceeding through the mipmap chain, until at least one side of the mipmap reaches a single texel, each mipmap is ¼ the size of the previous mipmap for this square texture example.

In some embodiments, each mipmap chain is stored in memory with the texture first, followed by successively smaller mipmaps. When a particular LOD is needed, TPU 165 is configured to determine the offset from a base address of the texture to determine the address at which the mipmap is located. For example, if LOD 1 of FIG. 2A is desired, the offset is the number of bytes needed to store 16×16=256 texels (the size of the texture). As another example, if the LOD 2 is desired, the offset is the number of bytes needed to store 16×16+8×8=320 texels (the size of the texture and the LOD 1 mipmap).

Power consumption and chip area are typically important design parameters in graphics processing, especially for mobile devices. Therefore, circuitry for determining the location (e.g., offset from a texture base address) of a desired mipmap should be power and area efficient. In some embodiments, the offset calculation is primarily performed using simple logic gates (e.g., AND and OR gates rather than adder circuitry) to reduce power consumption and area relative to more complex conventional circuitry.

FIG. 2B shows exemplary storage of mipmap chains in a memory. In the illustrated embodiment, mipmap chain 1 and mipmap chain 2 are stored consecutively. In this example, mipmap chain 1 has a greatest chain size that a GPU is configured to store. For example, in a GPU configured to store textures up to 4×4 texels in size, the size of mipmap chain 1 would be 10101 texels (expressed in binary), corresponding to 10000 (size of 4×4 texture in binary)+100 (size of 2×2 mipmap in binary)+1 (size of 1×1 mipmap in binary). Thus, as shown the greatest potential chain size includes the texture and every mipmap for the texture, including the smallest texture. Note that, as shown, the greatest potential offset value within mipmap chain 1 does not include the smallest texture (because, when accessing this particular mipmap chain, the greatest offset to the beginning of a mipmap in the chain is to the beginning of the smallest mipmap in the chain. Thus, as used herein, the phrase "a value indicative of a greatest potential chain size" includes both the greatest potential chain size and the greatest potential offset value (which indicates the greatest potential chain size because the greatest potential claim size can be implied based on the size of the smallest mipmap).

In some embodiments, the greatest potential chain size is used as a starting value to operate on, which may be helpful in situations with multi-dimensional textures and/or arrays of textures. For example, if mipmap chain 2 were for another z-value of a three-dimensional texture that also includes mipmap chain 1, then maintaining the greatest potential chain size of mipmap chain 1 might be useful in determining an overall offset (e.g., when an offset to a particular z-value includes multiple mipmap chains, it may be useful to know the full size of each chain). In other embodiments or situations, the greatest potential offset value may be used. Use of the greatest potential chain size and/or greatest potential offset value to determine an offset to a desired LOD is described in further detail below.

Exemplary Offset Determination

In some embodiments, TPU 165 is configured to perform logic operations on a value to generate the offset of a desired mipmap. In some embodiments, the value is indicative of a greatest potential chain size for chains of mipmaps stored in a graphics processing element.

FIG. 3 shows an example of offset determination according to some embodiments. As show in FIG. 3, an exemplary GPU has a maximum texture size of 16384×16384 texels ($2^{14}$ by $2^{14}$)=$2^{28}$ total texels. In other embodiments, GPUs may support textures of various sizes; the disclosed sizes are exemplary and are not intended to limit the scope of the present disclosure. Further, a given GPU may be configured to support different texture sizes using different circuitry or in different modes. In these embodiments, reference to a "greatest potential texture size" or a "greatest potential chain size" for chains of mipmaps in the GPU may refer to the greatest size in a particular mode and/or for particular subset of GPU circuitry.

In the illustrated example, a maximum texture size of $2^{28}$ allows a maximum of 15 different LODs in the mipmap chain. In this example, the greatest potential chain size for mipmap chains in the GPU is 10101010101010101 0101010101 (binary). A value that indicates the greatest potential chain size for mipmap chains in the GPU may be referred to as the "2D starting value" for a given texture. As discussed above with reference to FIG. 2B, in some embodiments, the 2D starting value indicates the greatest potential chain size even when it is not exactly equal to the greatest potential chain size. For example, the least significant "1" may be left off the 2D starting value, in some embodiments, without affecting the accuracy of the disclosed techniques, because the 1×1 texture corresponding to that bit position may be the last texture in the chain (such that offsets beyond the 1×1 texture are not needed). In this example, the value indicative of the greatest potential chain size could be 10101010101010101010101010100, which is the greatest potential offset value. In the illustrated embodiment, using the greatest potential chain size instead of the greatest potential offset value may facilitate processing of three-dimensional textures or arrays of mipmap chains, for example, as discussed above with reference to FIG. 2B.

FIG. 3 also shows the maximum size of mipmaps that are smaller in only one dimension relative to a prior mipmap (which includes most mipmaps that include a single pixel in one dimension). In the illustrated embodiment, this value is 111111111111111 (binary). A value indicating to the size of mipmaps which are smaller in only one dimension relative to their respective prior mipmaps may be referred to as the "single-pixel side starting value" for a given texture. The example value shown corresponds to the size of such mipmaps in a mipmap chain for a $2^{14}$ by 1 texture.

FIG. 3 shows texture attributes for an exemplary $2^{11}$ by $2^8$ texture 340. In some embodiments, these attributes are stored in texture state information for a given texture. For the exemplary texture of FIG. 3, the small side exponent is eight and the large side exponent is eleven. For this texture, the number of LODs with different small sides is nine (the small side exponent of eight plus one) while the number of LODs with different large sides is twelve (the large side exponent of eleven plus one). Based on this information, in some embodiments, TPU 165 is configured to operate on the 2D starting value to generate the offset of a desired mipmap 350 corresponding to LOD 1.

First, in the illustrated example, the average number of LODs with different sizes for the height and width dimensions is determined to be 12+9/2=10.5 (the average of the number of LODs with different small sides and the number of LODs with different large sides). This average may be helpful in determining the overall size of the texture relative to the greatest potential texture size, and using this average may be similar to treating the texture as a square, which may facilitate further operations. In the illustrated technique, the average is used in masking both upper and lower bits of the 2D starting value. In this example, based on the integer portion of the average, TPU 165 is configured to mask the upper N bits of the 2D starting value, where N=2×(max number of LODs in mipmap chain−integer portion)=2×(15−10)=10 bits, as shown.

Based on the integer portion of the average and the target LOD, TPU 165 is also configured to mask the lower 2×(integer portion−target LOD)=2×(10−1)=18 bits of the 2D starting value, as shown. Speaking generally, this removes bits corresponding to the sizes of mipmaps that come after the target LOD in the chain, based on the size of the texture and the target LOD. In this example, because the average number of LODs with different sizes was a non-integer value (and thus treating this texture as square is not really possible), the result is left-shifted by one (otherwise, for integer averages, the result is not shifted in some embodiments). Said another way, whether or not to left-shift by one may be determined based on whether a sum or difference of the side integers (or side number of different LODs) is even or odd. These operations result in the desired offset of 000000000100000000000000000000 (note that this corresponds to the size of texture 340, giving us the desired offset to LOD 1).

Note that in the example of FIG. 3, there were no mipmaps with changes in only one dimension in the chain prior to reaching the desired level (LOD 1). In some embodiments, the size of these mipmaps is determined by comparing the desired LOD to the number of LODs with different small sides. In these embodiments, the single-pixel side levels need be considered only if the desired LOD is greater than the number of LODs with different small sides. FIG. 4A, discussed below, provides an example in which these LODs are considered.

Most of the operations discussed with reference to FIG. 3 may be performed using shift registers and/or AND gates, reducing area and power consumption in circuitry configured to determine the offset, relative to implementations in which mipmap sizes are added to determine a desired offset, for example.

Note that various disclosed examples utilize textures with sides that have a number of texels that is a power of two. In various embodiments, however, graphics unit 150 supports texture sizes that are not powers of two. In some embodiments, graphics unit 150 is configured to pad non-power-of-two textures to the next largest power of two in one or more dimensions as necessary. Thus, in some embodiments, the widthNumLODs and heightNumLODs values may be determined based on this padding. For example, for a 9×9 texture, the mipmap pyramid might have the following levels: 9×9, 4×4, 2×2, 1×1. In this example, after padding the texture to a 16×16 memory footprint, the widthNumLODs would be five (even though there are only four levels in the mipmap pyramid) to facilitate the processing described above and obtain the correct offset. Said another way, in some embodiments, the value corresponding to the number of LODs with different numbers of pixels in a given dimension may be modified to reflect textures with non-power-of-two sides.

FIG. 4A shows another example of offset determination for texture 340, but for a different desired mipmap than FIG. 3. In FIG. 4A, the desired mipmap 460 is at LOD 11 and is a 1×1 mipmap. The exemplary GPU and texture attributes in FIG. 4A are the same as those shown in FIG. 3.

As shown, for desired LOD 11, the upper bits are masked similarly to FIG. 3. For the lower mask, because the desired LOD is larger than the number of LODs with different small sides, the number of masked bits is determined as 2×(integer portion of average−number of LODs with different small sides)=2×(10−9)=2 bits. In this situation, in some embodiments, the masking is performed because the lower bits are determined based on the greatest potential 1D size.

For the single-pixel side portion, in this example, the number of masked upper bits of the single-pixel side starting value is determined as greatest potential number of LODs in the mipmap chain minus (the number of LODs with different large sides−the number of LODs with different small sides)=15−(12−9)=12 bits. Speaking generally, the greater the difference between the number of different large sides and number of different small sides, the greater the potential number of mipmaps with a single pixel in one dimension (and the smaller the number of upper bits to be masked).

In the illustrated example, the number of masked lower bits is determined as the difference between the number of LODs with different large sides and the target LOD=12−11=1. Speaking generally, this masking is performed based on how many mipmaps with a single pixel in one dimension are included in the chain prior to the target LOD, (e.g., a target LOD further along in the chain typically results in masking less bits than a target LOD higher in the chain).

In the illustrated example, the resulting value after masking upper and/or lower bits is then ORd with the 2D size determined above, to achieve the desired offset of 000000000101010101010101110 (binary) (note that this corresponds to the size of every mipmap in the exemplary chain except for the desired mipmap, because it is the last mipmap in this chain).

Figure 4B:
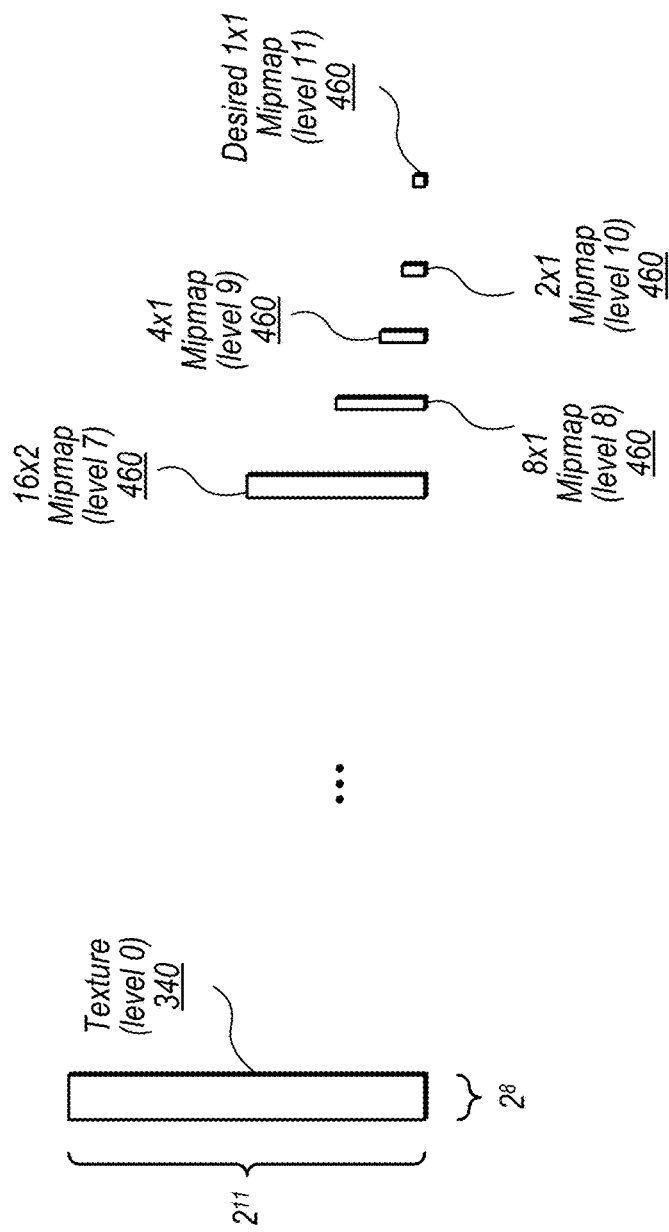

FIG. 4B shows additional levels of the exemplary mipmap chain of FIGS. 3-4. In the embodiment of FIG. 4A, the 2D size corresponds to the size of the texture and LODs 1 through 8 (including the 8×1 texture) and the single-pixel side size (000000000000110 (binary) in the example of FIG. 4A) corresponds to the size of LODs 9 and 10. Note that FIG. 4B is not drawn to scale.

FIG. 5 shows exemplary hardware description language (HDL) pseudocode for configuring circuitry to determine the offset to a target LOD (e.g., as discussed above with reference to the examples of FIGS. 3-4). In some embodiments, circuitry in TPU 165 is configured to implement the operations specified by the pseudocode using shift registers, AND gates, and/or OR gates. In some embodiments, TPU 165 is configured to implement the operations without using adder circuitry (i.e., circuitry that uses a carry signal) to add mipmap sizes. (Note that in some embodiments, a small adder may be used to determine the average number of LODs, for example, as shown in line 9 below).

At line 1, the signal TWO_D_MAX_NUM_TEX is set to 101010101010101010101010101 (binary). This corresponds, in this embodiment, to the 2D starting value, which is the greatest potential chain size for chains of mipmaps stored in a GPU having a greatest potential texture size of up to $2^{14}$ by $2^{14}$. In other embodiments, this value may be configured for different max texture sizes. This value may be implemented by a storage element or other circuitry as a constant value, in some embodiments. At line 2, the signal ONE_D_MAX_NUM_TEX is set to 111111111111111 (binary). This corresponds, in this embodiment, to the single-pixel side starting value, which is the greatest potential chain size for LODs that decrease in size in a single dimension relative to a previous LOD, in chains of mipmaps stored in the GPU. At line 3, the signal MAX_NUM_LODS is defined as a 4-bit value 15 (decimal). This corresponds, for the illustrated value of the TWO_D_MAX_NUM_TEX signal, to the greatest potential number of LODs of different sizes in the mipmap chain.

At lines 4-6, inputs widthNumLODs, heightNumLODs, and targetLOD are defined. The targetLOD corresponds to the desired or specified LOD to be accessed, while width-NumLODs and heightNumLODs correspond to the number of LODs with different sizes in the width and height directions respectively (9 and 12 in the example of FIG. 3). The targetLOD is provided, in some embodiments, by circuitry in TPU 165 based on the depth of an object in a scene being rendered (although in other embodiments it may be provided directly by a graphics program, by other circuitry, etc.).

At lines 7-8, signals smallNumLODs and largeNumLODs are set. For example, for $2^{11}$ by $2^8$ and $2^8$ by $2^{11}$ textures, smallNumLODs would be set to 9 (the small side exponent plus one) and largeNumLODs would be set to 12 (the large side exponent plus one). These values correspond to the number of LODs, for the texture, with different sizes in a particular dimension.

At line 9, the signal avgNumLODs×2 is set to smallNumLODs plus largeNumLODs. In the example of FIG. 3, this value is 21=10101 (binary) and corresponds to two times the average number of LODs with different sizes. In some embodiments, a small adder (e.g., a 5-bit adder for the exemplary GPU) may be used to implement line 9.

At line 10, the signal upperMaskNumBits is set to MAX_NUM_LODS minus the upper four bits of avgNumLODs×2, with the result of the subtraction left-shifted by one. In the example of FIG. 3, this value is ten.

At line 11, the signal lowerMaskNumBits is set to the upper four bits of avgNumLODs×2 minus targetLOD, left-shifted by one. In the example of FIG. 3, this value is eighteen. In the example of FIG. 4A, this value is two.

At line 12, the signal upperMask is determined by right shifting the value 11111111111111111111111111111111 (binary) to the right by upperMaskNumBits.

At line 13, the signal lowerMask is determined by left shifting the value 11111111111111111111111111111111 (binary) to the left by lowerMaskNumBits.

At line 14, the signal 2Dsize is determined by ANDing lowerMask, upperMask, and TWO_D_MAX_NUM_TEX and left-shifting the result by the value of the least-significant bit of avgNumLODs×2. 2Dsize corresponds, in these embodiments, to the size of the LODs to be included in the offset (to reach the target LOD from a base address of the texture) that are smaller in two dimensions than a previous LOD. Thus, in the illustrated embodiment, 2Dsize is generated by masking upper and lower bits of the TWO_D_MAX_NUM_TEX value based on the size of the texture (relative to the greatest potential texture size) and the position of the target LOD in the mipmap chain.

At line 15, the signal oneDValid is determined by comparing the targetLOD to smallNumLODs. Signal oneDValid is asserted, in this embodiment, if the targetLOD is greater (indicating that at least one mipmap to be included in the offset to reach the target LOD is smaller in only one direction relative to the previous LOD). In the example of FIG. 3, oneDValid is zero while in FIG. 4A, oneDValid is one.

At line 16, the signal oneDNumLevels is set to largeNumLODs minus smallNumLODs. In the example of FIG. 4A, this signal is set to three. At line 17, the signal oneDtargetLOD is set to either zero or largeNumLODs minus targetLOD depending on whether targetLOD is greater than largeNumLODs. In the example of FIG. 4A, signal oneDtargetLOD is set to one.

At line 18, the signal oneDMSBmask is determined by right-shifting the value 1111111111111111 (binary) by fifteen minus oneDNumLevels. At line 19, the signal oneDLSBmask is determined by left-shifting the value 1111111111111111 (binary) by oneDtargetLOD.

At line 20, the signal single_pixel_side_size is determined by ANDing the bits of oneDMSBmask, oneDLSBmask, ONE_D_MAX_NUM_TEX, and oneDValid. (If oneDValid is false, the result will be zero). The single-pixel_side_size corresponds, in these embodiments, to the size of the LODs to be included in the offset (to reach the target LOD) that are smaller in only one dimension than a previous LOD.

At line 21, the signal offset is set to 2Dsize ORd with single-pixel_side_size. In some embodiments, the offset signal corresponds to a number of texels, and the distance of the offset is determined based on the amount of storage used for each texel (e.g., if a byte is used for each texel, then the offset signal may have units of bytes).

The code and corresponding circuitry shown in FIG. 5 is exemplary and is not intended to limit the scope of the present disclosure. In other embodiments, various circuitry and signals may be used to perform similar operations. Further, in various embodiments, GPUs may support textures of any of various appropriate sizes.

In some embodiments, additional circuitry may be required to handle mipmap chains with multiple 1×1 levels and/or to pad all mipmaps to a particular size. Extra 1×1 mipmaps may be present for compressed texture and/or three-dimensional textures with more steps in the z-dimension than width and height dimensions, for example. In some embodiments, TPU 165 is configured to determine the number of 1×1 LODs and modify the determined offset accordingly (e.g., by adding to the offset based on the number of 1×1 LODs).

In some embodiments, each mipmap is padded to a particular minimum threshold size. This may facilitate caching of the mipmap chain, for example. It may also facilitate access to mipmaps for other modules (e.g., that may want to access a particular LOD level as if it were a texture). In this case, the other modules may utilize base addresses for such accesses that are aligned to the threshold size rather than that requiring byte-aligned based addresses, for example. In these embodiments, TPU 165 is configured to appropriately pad the sizes of mipmaps that are smaller than the threshold size and operate on the determined offset value accordingly. In some embodiments this includes masking lower bits of the determined offset and then ORing a result of the masking with a padded size for the mipmaps that are smaller than the threshold size.

Exemplary Method

Referring now to FIG. 6, a flow diagram illustrates an exemplary method 700 for determining an offset to a particular LOD, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired. Method 600 begins at 610.

At 610, TPU 165 is configured to mask upper bits of a value based on the size of a texture. In the illustrated embodiment, the value is the greatest potential chain size for chains of mipmaps in a graphics processing element. For example, as discussed above with reference to FIG. 3, the number of bits masked may be determined based on a difference between a maximum number of different LODs for a GPU and an average number of LODs with different sizes for the texture.

As used herein, the term "mask" is intended to be construed according to its well-understood meaning in the art, including ANDing a value with a mask value (e.g., that includes zeros for masked bits). Masking may also include other logical operations that clear masked bits, such as shift operations in some instances (e.g., for values known to contain repeating 1's at relevant bit positions). The term "mask" does not, however, encompass more complex operations performed by adder circuitry, for example, that is configured to determine one or more carry bits.

At 620, TPU 165 is configured to mask lower bits of the value based on a position of a specified mipmap in a chain of stored mipmaps (e.g., a specified LOD). In some embodiments, TPU 165 includes circuitry configured to determine and specify the mipmap (e.g., the desired LOD) based on a depth of an object in a scene being rendered.

In some embodiments, the method also includes accessing the mipmap based on the offset address (e.g., using the address of the texture itself and adding the offset). In some embodiments, the method also includes left-shifting the masked value based on a least significant bit of a sum of side exponent value for the texture (e.g., as specified in line 14 of FIG. 5). In some embodiments, the method includes adding a second value to the masked value. In some embodiments, the second value is determined based on the single-pixel side starting value, a difference between a large side exponent and a small side exponent of the texture (which also corresponds to the difference between the large number of LODs and the small number of LODs), and the position of the specified mipmap in the chain of stored mipmaps. In some embodiments, the single-pixel side starting value indicates a greatest potential size of a portion of mipmap chains in the graphics unit for which mipmap sizes decrease in only a single dimension. Speaking generally, the single-pixel side starting value is, in some embodiments, based on a number of relevant mipmaps in the chain having a single texel in a first dimension and more than one texel in a second dimension. For example, in the chain 16×2, 8×1, 4×1, 2×1, 1×1, the single-pixel side starting value corresponds to the size of the 4×1, 2×1, and 1×1 mipmaps.

Exemplary Device

Referring now to FIG. 7, a block diagram illustrating an exemplary embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720, input/output (I/O) bridge 750, cache/memory controller 745, graphics unit 750, and display unit 765.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. Compute complex 720 may correspond to processor 100 in some embodiments. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 750 may be described as "coupled to" a memory through fabric 710 and cache/memory controller 745. In contrast, in the illustrated embodiment of FIG. 7, graphics unit 750 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   texture processing circuitry configured to:
   receive information specifying a particular mipmap in a chain of stored mipmaps for a graphics texture; and
   determine an offset address for the particular mipmap by applying a plurality of masks to a value that is indicative of a greatest potential chain size supported by the texture processing circuitry for chains of mipmaps, the applied masks including:
   a mask of upper bits of the value based on a size of the texture; and
   a mask of lower bits of the value based on a position of the specified mipmap in the chain of stored mipmaps.

2. The apparatus of claim 1, wherein the texture processing circuitry is further configured to:
   access the particular mipmap based on the offset address; and
   determine pixel attributes for one or more pixels in one or more frames of graphics data based on texel data accessed in the mipmap.

3. The apparatus of claim 1, further comprising circuitry configured to determine the particular mipmap based on a position of an object in a graphics frame.

4. The apparatus of claim 1, wherein the applying the plurality of masks is performed by ANDing the greatest potential chain size with a mask value.

5. The apparatus of claim 1, wherein the texture processing circuitry is further configured to:
   left-shift the masked value in response to determining that a sum of side exponent values for the texture is an odd number;
   wherein the apparatus is configured not to perform the left-shift of the masked value in response to determining that a sum of side exponent values for the texture is an even number.

6. The apparatus of claim 1, wherein the texture processing circuitry is further configured to:
   add a second value to the masked value, wherein the second value is determined based on:
   a number of mipmaps in the chain having a single texel in a first dimension and more than one texel in a second dimension; and
   the position of the specified mipmap in the chain of stored mipmaps.

7. The apparatus of claim 6, wherein the texture processing circuitry is configured to add the second value to the masked value by ORing bits of the second value with bits of the masked value.

8. The apparatus of claim 1, wherein the texture processing circuitry is further configured to:
   operate on a result of the masking based on a number of 1×1 mipmaps for the texture.

9. The apparatus of claim 1, wherein the texture processing circuitry is further configured to:
   operate on a result of the masking based on mipmaps for the texture having a size that is smaller than a threshold size.

10. A method, comprising:
    determining an offset address for a specified mipmap in a chain of stored mipmaps for a graphics texture, including;
    operating on a value indicative of a greatest potential chain size supported by a graphics processing element for chains of mipmaps, wherein the operating includes:
    masking upper bits of the value based on a size of the texture; and
    masking lower bits of the value based on a position of the specified mipmap in the chain of stored mipmaps;
    wherein the operating converts the greatest potential value to the offset address.

11. The method of claim 10, further comprising:
    accessing the mipmap based on the offset address.

12. The method of claim 10, further comprising:
    determining the particular mipmap based on a position of an object in a graphics frame.

13. The method of claim 10, further comprising:
    left-shifting the masked value based on a least significant bit of a sum of side exponent values for the texture has a particular pre-defined value.

14. The method of claim 10, further comprising:
    adding a second value to the masked value, wherein the second value is determined based on:
    a difference between a large side exponent and a small side exponent; and
    the position of the specified mipmap in the chain of stored mipmaps.

15. The method of claim 14, further comprising determining the second value, including:
    masking upper bits of a third value based on the difference between the large side exponent and the small side exponent, wherein the third value is indicative of a greatest potential size of a portion of mipmap chains in the graphics processing element for which mipmap sizes decrease in only a single dimension; and
    masking lower bits of the third value based on the position of the specified mipmap in the chain of stored mipmaps.

16. A graphics unit, comprising:
    first circuitry configured to specify a particular level of detail corresponding to a mipmap in a chain of stored mipmaps for a graphics texture;
    texture processing circuitry configured to determine an offset address for the mipmap, wherein, to determine the offset address, the texture processing circuitry is configured to mask bits of a value that indicates a greatest potential chain size supported by the graphics unit for chains of mipmaps.

17. The graphics unit of claim 16, wherein the texture processing circuitry is configured to:
    mask upper bits of the value based on a difference between a greatest potential texture size for the graphics unit and a size of the texture; and mask lower bits of the value based on a position of the mipmap in the chain of stored mipmaps.

18. The graphics unit of claim 16, wherein the texture processing circuitry is configured to add to a result of the masking based on a number of 1×1 mipmaps in the texture being greater than one.

19. The graphics unit of claim 16, wherein the texture processing circuitry is configured to adjust a result of the masking based on one or more mipmaps for the texture having a size that is smaller than a threshold size.

20. The graphics unit of claim 16, wherein the texture processing circuitry is configured to:
- add a second value to the masked value, wherein the second value is determined based on:
  - a difference between a first number and a second number, wherein the first number is a number of mipmaps for the texture with different sizes in a first dimension and the second number is a number of mipmaps for the texture with different sizes in a second dimension; and
- the position of the mipmap in the chain of stored mipmaps.

\* \* \* \* \*